United States Patent [19]

Buckler et al.

[11] 4,256,857

[45] Mar. 17, 1981

[54] HALOBUTYL OF IMPROVED GREEN STRENGTH

[75] Inventors: Ernest J. Buckler, Sarnia; George Feniak, Wyoming, both of Canada

[73] Assignee: Polysar Limited, Sarnia, Canada

[21] Appl. No.: 37,371

[22] Filed: May 9, 1979

Related U.S. Application Data

[63] Continuation-in-part of Ser. No. 842,119, Oct. 14, 1977, abandoned, which is a continuation-in-part of Ser. No. 494,302, Aug. 2, 1974, abandoned.

[30] Foreign Application Priority Data

Nov. 8, 1973 [CA] Canada ................................ 185311

[51] Int. Cl.$^3$ ................................................ C08F 8/30
[52] U.S. Cl. ...................... 525/331; 152/204; 152/DIG. 12; 525/209; 525/379; 525/346
[58] Field of Search ................ 260/890; 525/331, 379

[56] References Cited

U.S. PATENT DOCUMENTS

| | | | |
|---|---|---|---|
| 2,984,642 | 5/1961 | Minckler, Jr. | 526/20 |
| 3,011,996 | 12/1961 | Kuntz | 526/17 |
| 3,098,055 | 7/1963 | Lemiszka | 526/17 |
| 3,104,235 | 9/1963 | Kuntz | 526/50 |
| 3,163,626 | 12/1964 | Minckler, Jr. | 526/20 |
| 3,397,174 | 8/1968 | Parker | 260/45.9 R |

*Primary Examiner*—C. A. Henderson
*Attorney, Agent, or Firm*—Stevens, Davis, Miller & Mosher

[57] ABSTRACT

Bromobutyl rubber compounds of improved green strength are prepared by reacting bromobutyl rubber with selected amine compounds such that not less than about 1/100th and not more than 1/12th of the bromine in the bromobutyl is reacted with the amine compound.

5 Claims, No Drawings

HALOBUTYL OF IMPROVED GREEN STRENGTH

This is a continuation-in-part of application Ser. No. 842,119, filed Oct. 14, 1977 now abandoned, which in turn is a continuation-in-part of application Ser. No. 494,302, filed Aug. 2, 1974, now abandoned.

BACKGROUND OF THE INVENTION

This invention relates to bromobutyl rubber, and more particularly to bromobutyl rubber of improved green strength and methods for its preparation.

Butyl rubber is well known. The commercially available rubber comprises a copolymer of isobutylene and isoprene, the amount of isoprene being from about one half of about three weight percent of the copolymer. It is highly inert, chemically resistant, rubbery polymer which can be compounded and cured to give synthetic rubber of outstanding air impermeability, useful in making tire inner tubes.

Bromobutyl is also well known. It may be prepared by treating a solution of butyl rubber, in an organic solvent, with bromine and recovering the bromobutyl by contacting it with steam and drying the resulting aqueous slurry. Bromobutyl may contain up to 3 bromine atoms per carbon-carbon double bond originally present in the polymer or expressed another way, from 0.5 to 15 weight percent of bromine. A preferred bromobutyl contains about one bromine atom per carbon-carbon double bond originally present in the polymer or about 1 to 5 weight percent of bromine and a most preferred bromobutyl contains from about 1.5 to about 3 wt. percent bromine. Bromobutyl has a greater degree of reactivity than butyl, so that it can be blended with other unsaturated polymers and co-vulcanized therewith, which the unreactivity of butyl precludes. Bromobutyl vulcanizates, however, show good air impermeability, heat aging characteristics and general chemical resistance. It finds one of its principal uses in the tubeless tire inner liners. Such liners are in effect thin sheets of rubber, adhered to the tire carcass by co-vulcanization with the rubbers comprising the tire carcass. The heat aging characteristics, air impermeability and co-vulcanizability of bromobutyl render it suitable for use in such tire inner liners. Other known uses for bromobutyl include tire white sidewall compounds, heat resistant tubes and bladders.

A deficiency of bromobutyl is its lack of green strength. Green strength is a term applied to denote the strength, cohesiveness and dimensional stability of rubber compounds before they are vulcanized or cured. Lack of green strength renders difficult the processing and moulding of rubber compounds based on bromobutyl. For example, in the manufacture of tire liners, very thin sheets of bromobutyl rubber compound have to be prepared, applied to the green tire carcass and then cured. If the bromobutyl rubber compound is deficient in green strength, there is risk of rupturing the thin sheets unless very careful handling thereof is undertaken.

SUMMARY OF THE INVENTION

The present invention provides bromobutyl rubber compounds of improved green strength. It has been discovered that the green strength can be substantially improved by the process of treating the bromobutyl with relatively small amounts of certain organic amine compounds. The improvement in green strength according to the invention is achieved without substantial sacrifice of any of the other desirable properties or processability of bromobutyl and does not interfere with the subsequent curing operations conventionally conducted with bromobutyl compounds or the usefulness of the vulcanizates so obtained.

The theoretical basis of the present invention has been tentatively established only, and it is not intended that the invention should be limited to any theoretical considerations. It appears that one can react a small number of the bromine groups on the bromobutyl copolymer with the amine groups on certain specified amines as herein disclosed, to form some kind of labile bonds or associations between the polymer chains. It is believed that this labile bonding is responsible for the increase in green strength of the compounds. However, on processing the rubber compounds, e.g. on mixing, milling, extruding etc., these labile bonds seem to disappear, perhaps due to the high shearing forces and especially the somewhat elevated temperatures encountered in such operations, so that the green strength rubber compound processes as a normal polymer. These labile bonds appear to be reversible, so that when the compound cools down again after processing, the labile bonds re-form and high green strength of the compound is recovered. The labile bonds are thus different in chemical nature and stability from crosslinks formed on curing the rubber, e.g. with sulphur, zinc oxide, etc., which crosslinks are chemically much stronger and essentially irreversible.

In accordance with this theoretical explanation, it has been found that the amounts of amine compound which are added to the bromobutyl are important. It has been found desirable to use between about 1/100th and about 1/12th, most preferably from 1/50th to 1/12th, of a chemical equivalent of amine per chemical equivalent of bromine in the bromobutyl rubber. Thus one effectively utilizes from about 1 to about 8.5 percent, preferably from about 2 to about 8.5 percent, of the bromine present for formation of the labile bonds to confer green strength. If too much amine is used, thereby forming too many labile bonds, high green strength is achieved but at the expense of processability of the rubber compound and too little unreacted bromine may be left for the subsequent conventional curing operation, which is also believed to involve reactions of the bromine groups at least in part. If too little amine is used, then green strength developed is inadequate.

Amine compounds suitable for treating bromobutyl rubber to improve the green strength thereof are tertiary amines selected from compounds of structure

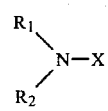

where $R_1$ and $R_2$ are methyl or ethyl groups and where X is one of
(a) an alkyl group having 5 to 30 carbon atoms, or
(b) a $C_1$ or $C_2$ alkylene group attached to benzene, the amount of said amine being from about 1/100th to about 1/12th of a chemical equivalent of amine per chemical equivalent of bromine in the bromobutyl rubber.

DETAILED DESCRIPTION OF THE INVENTION

Examples of suitable amine compounds include N,N-dimethyl hexylamine, N,N-dimethyl dodecylamine, N,N-dimethyl octadecylamine and N,N-diethyl decylamine as examples of amines of group (a) and N,N-dimethyl benzylamine as example of group (b).

These amine compounds have been found to provide green strength and allow the retention of good processing properties. While other amine compounds may be reacted with bromobutyl to improve the strength of the rubber compound they generally also cause the rubber compound to be of inferior processing properties, which is believed to be due to the formation of permanent crosslinks. The inferior processing properties include not being able to form a smooth sheet, a high nerve and a retention of the strength at temperatures above about 40° C., especially above about 50° C. and up to 75° C. or more. Like other rubbers, bromobutyl compounds show, when milled at temperatures above about 40° C., reduced strength and lower viscosity which permits the easy incorporation of the compounding ingredients and the formation of smooth, even sheets of the compounded stock. When amines other than the tertiary amines defined above are used these processing requirements are generally not met.

The amine can be added to the bromobutyl polymer according to the present invention at substantially any stage after the polymer has been formed. The amine reacts slowly with bromobutyl at room temperature, and hence adequate time must be given for the reaction to occur. Advantageously, the bromobutyl/amine mixture may be heated to increase the rate of reaction; the temperature for reaction may be between about 25° C. and about 150° C., preferably between 50° and 100° C., for times between about 1 hour and about 48 hours, preferably between 5 and 20 hours. In practice, the amine may be added to the solution of bromobutyl rubber in solvent after the bromination step or to the aqueous slurry thereof. Then, the temperatures required for reaction are encountered during the recovery and drying of the rubber. Preferably, the amine is added to the rubber in a Banbury or on a mill, following which the rubber mixture is heated to allow the reaction to proceed.

The improved green strength bromobutyl of the present invention can be compounded alone or blended with other rubbers and processed with the same ingredients and the same procedures as used with conventional bromobutyl, i.e. with fillers such as carbon black, silica or clay, with plasticizers, extender oils and tackifiers and with vulcanizing agents such as zinc oxide and/or sulfur with or without additional vulcanization accelerations. Such other rubbers with which the green strength bromobutyl of this invention may be blended include those with which bromobutyl may be blended such as the unsaturated rubbers including natural rubber, polybutadiene, polyisoprene and styrene-butadiene polymers and the lesser unsaturated rubbers such as ethylene-propylene-diene polymers. The improved green strength bromobutyl, alone or blended with other rubbers, may be cured by reaction with curatives well known in the art, the amounts of such curatives being those conventionally used. The amount of other compounding ingredients is within the ranges known in the art.

From the viewpoint of green strength, the best polymer compositions are those of which the behavior on subjecting to stress in the uncured state is similar to that of compositions based on natural rubber. If one measures the tensile stress required to cause increasing amounts of elongation in natural rubber green compounds, (i.e. a stress/strain curve) at room temperature, one finds in general that the stress is greater the greater the elongation, all the way up to rupture of the specimen. In order words, the stress-strain curve has a generally positive slope at all places. The shape of the curve changes somewhat at elevated temperatures, so that at such temperatures the stress falls off with increasing elongation showing that the strength drops. The stress/strain curves of conventional bromobutyl have a different shape. The curves at room temperature reach a maximum stress value at around 60-80% elongation and then have a fairly large negative slope. The maximum stress at such a low elongation and the large negative slope indicate severe weakness in the composition and risk of rupture. Thus, it is desirable that the rubber composition used for building tire inner liners and the like, where it has to withstand handling and shaping in the form of very thin sheets in the uncured green state, have a green stress-strain behaviour similar to that of natural rubber compositions. Small negative slopes in the stress-strain curve at room temperature are tolerable.

In connection with compounds of the present invention, this tolerable room temperature green strength behaviour is conveniently expressed on the basis of the relative change in modulus (i.e. extending force) in causing extension of the green compound from 100% extension to 200% extension. A negative value for this change indicates a negative slope on the stress-strain curve at these values. Sprecifically, it has been found that when the percentage change in modulus, i.e. value:

$$\Delta M = \frac{200\% \text{ modulus} - 100\% \text{ modulus} \times 100}{100\% \text{ Modulus}}$$

is from $-10\%$ to $+15\%$, and preferably from $-5\%$ to $+15\%$, at room temperature a compound of satisfactory green strength is obtained. This criterion is not met by conventional halobutyl compositions. It is met by compositions of the present invention. It has also been found desirable that the percentage change in modulus at 50° C. or higher should be negative, preferably below $-5\%$ and most preferably below $-10\%$. In addition, rubber compositions of satisfactory green strength have a room temperature green elongation at break of at least 250%.

The invention is further illustrated in the following specific examples.

EXAMPLE 1

The bromobutyl rubber used had a Mooney (ML1+12 at 125° C.) of 45 and contained 2.0 weight % bromine.

Samples of the bromobutyl rubber were reacted with various amines. Reaction of the rubber and the amine was achieved by mixing the rubber on a mill at about 65° C., and adding the desired amount of amine thereto. The polymer was then sheeted out and heated in a circulating air over at 90° C. for sixteen hours, so as to ensure complete reaction of the amine with the polymer. The polymer was then compounded in the usual way, in a recipe generally suitable for making tire inner liners with bromobutyl, as follows:

| | | |
|---|---|---|
| Polymer | 100 | parts by weight |
| Carbon black (GPF) | 62.5 | parts by weight |
| Oil (Zerice 45) | 14.0 | parts by weight |
| 2,2'-dithiobisbenzothiazole (accelerator) | 1.25 | parts by weight |
| Resin tackifier (Amberol ST 149) | 4.0 | parts by weight |
| Stearic acid | 1.0 | parts by weight |
| Zinc oxide | 5.0 | parts by weight |
| Sulfur | 0.5 | parts by weight |

The green strength of these compounds was then measured using an Instron tester. The amines used and results of measuring green strength at room temperature, are given in Table I. The results clearly demonstrate the improved green strength of the polymer treated by the process of this invention.

In addition, samples of compounds 2, 5 and 6 were milled at about 65° C., and extruded through a Garvey die using a Royle extruder (Model ½) at 105° C. and 70RPM extruder screw speed, so as to gain an indication of processability. The extrusion and milling characteristics of these compounds were found to be not substantially different from those of the control compound 6.

The solubility in cyclohexane of the original bromobutyl was 96.4%; the solubility of compound 3 was found to be 91.3%—i.e. essentially no change in solubility. This is further evidence of the unusual character of the labile bonds formed by the process of the present invention.

TABLE I

| Compound Reference | 1 | 2 | 3 | 4 | 5 | 6 |
|---|---|---|---|---|---|---|
| | | | | | | (control) |
| N,N-dimethyldodecylamine (parts per 100 of rubber) | 0.33 | 0.45 | — | — | — | — |
| N,N-dimethyloctadecylamine (parts per 100 of rubber) | — | — | 0.47 | — | — | — |
| N,N-dimethyl hexylamine (parts per 100 of rubber) | — | — | — | 0.3 | — | — |
| N,N-dimethyl benzylamine (parts per 100 of rubber) | — | — | — | — | 0.3 | — |
| Elongation at break | >860% | >1000% | >1000% | 900% | 830% | 90% |
| Maximum tensile strength (kg/cm$^2$) | 8.4 | 27 | 15 | 14 | 20.5 | 3.2 |
| 100% modulus (kg/cm$^2$) | 4.4 | 5.0 | 4.8 | 4.2 | 4.8 | 3.2 |
| 200% modulus (kg/cm$^2$) | 4.7 | 5.7 | 5.2 | 4.6 | 4.9 | 2.8 |
| ΔM (%) | 6.8 | 14 | 8.3 | 9.5 | 2 | −12.5 |

EXAMPLE 2

Samples of the bromobutyl of Example 1 were treated with N,N-dimethyloctadecylamine (0.4 phr) as described in Example 1, heated and compounded in two recipes, one of which includes natural rubber, used for making tire inner liners. The green strength was determined and the compounds were tested for scorch time and were cured and the vulcanizates tested for stress/-strain properties. In comparison with the controls containing unmodified bromobutyl, it was found that the vulcanizate properties of the compounds according to the invention were not significantly affected. The improved green strength of the compounds of the invention is clearly seen, by comparing the green strength properties of Sample J with Sample K (Control) and of Sample L with Sample N (Control). The compounding recipes and results of testing the vulcanizates are given in Table II.

TABLE II

| Sample reference. | J | K | L | N |
|---|---|---|---|---|
| Untreated bromobutyl | — | 75 | — | 100 |
| Treated bromobutyl | 75 | — | 100 | — |
| RSS No. 1 | 25 | 25 | — | — |
| Carbon black (Sterling V) | 62.5 | 62.5 | 62.5 | 62.5 |
| Stearic acid | 1.0 | 1.0 | 1.0 | 1.0 |
| Resin Tackifier (Amberol ST 149). | 4.0 | 4.0 | 4.0 | 4.0 |
| Oil (Zerice 45) | 14.0 | 14.0 | 14.0 | 14.0 |
| Zinc Oxide | 5.0 | 5.0 | 5.0 | 5.0 |
| Benzothiazyl disulphide (accelerator) | 1.25 | 1.25 | 1.25 | 1.25 |
| Tetrone A (accelerator)(dipentamethylenethiuram tetrasulfide) | 0.20 | 0.20 | — | — |
| Sulfasan R(4,4'-dithiodimorpholine). | 0.15 | 0.15 | — | — |
| Sulfur | — | — | 0.5 | 0.5 |
| Scorch(t$_5$/135° C.) | 8 mins. 40 secs. | 8 mins. 11 secs. | 8 mins. 17 secs. | 8 mins. 6 secs. |
| Green Strength | | | | |
| Elongation at break % | 940 | 900 | 900 | 1000 |
| Elongation at maximum tensile % | 940 | 90 | 900 | 90 |
| Maximum tensile strength (Kg/cm$^2$) | 6.4 | 2.6 | 9.4 | 2.8 |
| 100% Modulus (Kg/cm$^2$) | 3.5 | 2.6 | 4.1 | 2.8 |
| 200% Modulus (Kg/cm$^2$) | 3.8 | 2.3 | 4.5 | 2.5 |
| ΔM % | 8.5 | −11.5 | 10.2 | −10.7 |
| Cure- 30 minutes at 166° C. | | | | |
| Tensile strength (Kg/cm$^2$) | 107 | 111 | 101 | 102 |
| Elongation at break % | 655 | 580 | 765 | 765 |

TABLE II-continued

| Sample reference. | J | K | L | N |
|---|---|---|---|---|
| 300% modulus (Kg/cm$^2$) | 10 | 12 | 10 | 10 |

EXAMPLE 3

Samples of the bromobutyl of Example 1 were treated with a variety of amines, subjected to heating and compounded prior to measurement of the green strength properties of the compounds. Illustrative of the process of the present invention is Experiment Nos. 51A and 51B, in which the amine is N,N-dimethyl hexylamine. Illustrative of the prior art reactions of halogenated butyl with amines outside the scope of the present invention is Experiment No. 52 using dodecylamine and Experiment No. 53 using pyridine. Illustrative of other amines outside the scope of the present invention is Experiment No. 54 using tri-ethylamine and Experiment No. 55 using N,N,N',N''-tetramethylhexamethylene diamine. The results are given in Table III. Experiments No. 51A and 51B show how the green strength decreases with elongation at elevated temperatures and both these compounds were readily processable. Experiment No. 52 shows that the green strength developed is much too high and that the strength did not decrease with increased elongation at elevated temperature; the compound did not process easily and yielded a very rough and nervy sheet. Experiments No. 53 and 54 show that no green strength is developed with these amines. Experiment No. 55 shows that the green strength is much too high and did not decrease with increasing elongation at elevated temperature and the compound was very rough and nervy. Experiment No. 56 is a control with no amine added and shows the very low level of green strength and that the green strength is rapidly lost at elevated temperature.

What we claim is:

1. A process of preparing bromobutyl rubber compositions of improved green strength which process comprises reacting bromobutyl rubber with a tertiary amine selected from N,N-dimethyl hexylamine, N,N-dimethyl dodecylamine, N,N-dimethyl octadecylamine, N,N-dimethyl decylamine and N,N-dimethyl benzylamine, the amount of said amine being from about 1/100th to about 1/12th of a chemical equivalent of amine per chemical equivalent of bromine in the bromobutyl rubber, the reaction being at a temperature of from about 25° C. to about 150° C. for a time of from 1 hour to about 48 hours.

2. The process of claim 1 wherein said bromobutyl rubber composition is characterized by a change in modulus in the green state from 100% extension to 200% extension of from −10% to +15% and an elongation at break in the green state of not less than 250%.

3. The process of claim 1 characterized in that the amine is added to the bromobutyl rubber when the bromobutyl rubber is one of (a) as a solution in a solvent, (b) as an aqueous slurry or (c) when in a Banbury mixer or on a mill.

4. The process of claim 1 characterized in that the bromobutyl rubber contains from about 1 to 5 weight percent of bromine.

5. The process of claim 4 characterized in that said amine is added to said bromobutyl rubber in a Banbury mixer or on a mill and the reaction takes place at a temperature of from 50° to 100° C. for a time between 5 and 20 hours.

TABLE III

| Experiment No. | 51A | | 51B | | 52 | | 53 | 54 | 55 | | 56 | |
|---|---|---|---|---|---|---|---|---|---|---|---|---|
| Bromobutyl | 100 | | 100 | | 100 | | 100 | 100 | 100 | | 100 | |
| Amine type | Dimethyl-hexylamine | | | | Dodecyl-amine | | Pyridine | Triethyl-amine | Tetramethyl-hexamethylene diamine | | — | |
| Amine amount | 0.1 | | 0.3 | | 0.25 | | 0.25 | 0.3 | 0.1 | | — | |
| Compound Recipe* | A | | B | | B | | C | B | A | | A | |
| Green Strength Properties Modulus (kg/cm$^2$) at elongation of: | 24° C. | 50° C. | 24° C. | 75° C. | 24°C. | 75° C. | 24° C. | 24° C. | 24° C. | 50° C. | 24° C. | 50° C. |
| 100% | 4.2 | 2.4 | 4.2 | 1.9 | 4.5 | 3.2 | 3.6 | 2.8 | 5.9 | 4.3 | 3.3 | 1.8 |
| 200% | 3.8 | 1.9 | 4.6 | 1.6 | 6.7 | 4.6(180%) | 3.1 | 2.3 | 9.7 | 5.9 | 2.9 | broke |
| 300% | 3.4 | broke | 5.3 | broke | 11.0 | broke | 2.5 | 1.7 | 16.7 | 6.3 | 2.4 | — |
| 400% | 3.2 | — | — | — | — | — | — | — | 21.8 | broke | 2.1 | — |
| Δ M % | −9.5 | −21 | 9.5 | −18.8 | 49 | + ive | −14 | −18 | 64 | 39 | −12 | |
| Elongation at max. stress % | 80 | | 900 | | 400 | | 70–80 | 90–100 | 450 | | 70–80 | |

*Recipe A - Polymer 100, Carbon Black (N660) 60, Stearic Acid 1, Resin (Escorez 1102) 8 and Oil (Sunpar 2280) 14.
Recipe B - Polymer 150, Carbon Black (Sterling V) 94, Oil (Zerice 45) 21.
Recipe C - Polymer 200, Carbon Black (Sterling V) 125, Oil (Zerice 45) 28, Resin (Amberol St-149) 8, SI-149) acid 2, Zinc oxide 10, Sulfur 1, Altax 2.5.